(12) United States Patent
Lang et al.

(10) Patent No.: US 10,685,126 B2
(45) Date of Patent: Jun. 16, 2020

(54) OPERATING A SECURE STORAGE DEVICE WITH A NON-VOLATILE MEMORY

(71) Applicant: INTERNATIONAL BUSINESS MACHINES CORPORATION, Armonk, NY (US)

(72) Inventors: Jakob C. Lang, Tuebingen (DE); Joerg Schmidbauer, Boeblingen (DE); Klaus Werner, Moetzingen (DE)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/876,502

(22) Filed: Jan. 22, 2018

(65) Prior Publication Data
US 2019/0228163 A1    Jul. 25, 2019

(51) Int. Cl.
*G06F 21/00* (2013.01)
*G06F 21/60* (2013.01)
*H04L 9/06* (2006.01)
*G06F 3/06* (2006.01)

(52) U.S. Cl.
CPC .......... *G06F 21/602* (2013.01); *G06F 3/0622* (2013.01); *G06F 3/0659* (2013.01); *G06F 3/0679* (2013.01); *H04L 9/0643* (2013.01)

(58) Field of Classification Search
CPC .... G06F 21/602; G06F 3/0679; G06F 3/0659; G06F 3/0622; G06F 21/62; G06F 21/6209; G06F 21/6218; G06F 21/6227; G06F 21/6236; G06F 21/6254; G06F 21/6245; G06F 21/6263; G06F 21/6272; G06F 21/6281; G06F 21/629; G06F 2212/402; H04L 9/0643

See application file for complete search history.

(56) References Cited

U.S. PATENT DOCUMENTS

| 8,332,865 B2 | 12/2012 | Schmidbauer et al. |
| 2010/0161928 A1* | 6/2010 | Sela .................... G06F 12/1441 711/163 |
| 2014/0177842 A1 | 6/2014 | Yellepeddy et al. |
| 2014/0282936 A1 | 9/2014 | Fitzgerald et al. |

(Continued)

OTHER PUBLICATIONS

Carnahan, "Security Requirements for Cryptographic Modules", NIST, https://www.nist.gov/publications/security-requirements-cryptographic-modules, U.S. Department of Commerce / National Institute of Standards and Technology, Jan. 11, 1994, pp. 1-2.

(Continued)

*Primary Examiner* — Jeffrey C Pwu
*Assistant Examiner* — Helai Salehi
(74) *Attorney, Agent, or Firm* — Michael O'Keefe

(57) ABSTRACT

A method for operating a secure storage device with a non-volatile memory on a computer system which executes multiple operating system instances. The non-volatile memory comprises one or more domains which are used by the operating system instances. A separate trusted key entry system is used to configure secret data of an operating system instance stored in the non-volatile memory. The method comprises setting a domain to either secure or non-secure mode; generating a unique identifier of the operating system instance; generating a secure hash for the operating system instance; and storing the secure hash in the domain.

16 Claims, 6 Drawing Sheets

(56) References Cited

U.S. PATENT DOCUMENTS

2016/0092243 A1* 3/2016 Boenisch .............. G06F 9/4408
713/2
2016/0092687 A1 3/2016 Boenisch et al.
2018/0232728 A1* 8/2018 Dooley ................ G06Q 20/385

OTHER PUBLICATIONS

Baldwin et al., "Encryption and Key management in a SAN", Proceedings of the First International IEEE Security in Storage Workshop (SISW'02), 2003 IEEE, pp. 1-10.
Bruni et al., "IBM z13 Configuration Setup", IBM.com/Redbooks, International Technical Support Organization, Chapter 10, "Crypto Express5S configuration", Apr. 2015, pp. 1-42.
Arnold et al., "The Next Generation of Highly Reliable and Secure Encryption for the IBM z13", IBM J. Res. & Dev. vol. 59 No. 4/5 Paper Jul. 6/Sep. 2015, pp. 1-13.
Wikipedia, "Transport Layer Security", https://en.wikipedia.org/wiki/Transport_Layer_Security, printed Dec. 29, 2017, pp. 1-17.

* cited by examiner

OPERATING A SECURE STORAGE DEVICE WITH A NON-VOLATILE MEMORY

The present invention relates in general to data processing systems and, in particular, to a method for operating a secure storage device with a non-volatile memory on a computer system which executes multiple operating system instances simultaneously as well as a computer program product and a data processing system.

BACKGROUND

Distributed computer systems provide increasingly effective ways of providing numerous types of services. As the complexity and ubiquity of distributed computer systems increases, however, maintaining data security becomes more challenging. There is a constant struggle to address security vulnerabilities at least as fast as they discovered. This struggle is exacerbated by the speed at which computer systems and their use evolve and the rate at which the stakes increase. At the same time, in many contexts, the security of data is of great importance. Many people, for example, trust companies with data that is intended to be kept private except in relatively few circumstances. Security breaches, consequently, can have harmful effects on an organization's operations, from a loss of trust and goodwill to an inability to do business due to a system malfunction caused by a security breach.

Over the years, many strategies have been developed to address the ever increasing threats to data security. Data encryption, for example, can provide an effective way of preventing unauthorized access to data. As a result, complex devices have been developed to securely store cryptographic information. While such devices often perform well for various purposes, integrating the devices into various infrastructure strategies can present many challenges. Further, such devices often require a significant investment, which can be an obstacle to many organizations.

Secure storage devices such as, e.g., hardware security modules (HSMs) provide a service to customers via a computing resource provider that remotely hosts various computing resources that are remotely managed and operated by the customers. A customer of the computing resource provider may utilize services of the computing resource to maintain a private network, such as a virtual local area network (VLAN) hosted by the computing resource provider. The VLAN may, for instance, be supported by infrastructure operated by the computing resource provider.

A secure connection, such as a virtual private network connection over an Internet protocol security (IPsec) tunnel, may connect the remotely hosted network to a network that is hosted on the premises of the customer. Traffic to and from the remotely hosted network may be managed by the computing resource provider so that, from the perspective of devices in the customer's on-premises network, communications with devices in the remotely hosted network occur as if the devices of the remotely hosted network are located in the customer's on-premise network. For example, communications to devices in the remotely-hosted network may be addressed by the customer devices to addresses in a space of network addresses managed by the customer (e.g., to network addresses in a subnet of a network managed by the customer). The computing resource provider may use various techniques, such as network address translation (NAT), to route network communications over its own network to their proper destinations.

SUMMARY

A method, computer program product, and computer system are proposed for operating a secure storage device with a non-volatile memory on a computer system which executes multiple operating system instances. The non-volatile memory comprises one or more domains which are used by the operating system instances. A separate trusted key entry system is used to configure secret data of an operating system instance stored in the non-volatile memory. The method comprises in response to a corresponding request from the trusted key entry system, the computer system setting a domain to either secure or non-secure mode; generating a unique identifier of the operating system instance; generating a secure hash for the operating system instance based on the unique identifier and domain specific cryptographic configuration data; in response to a request from a system administrator to configure the secure storage device for use, storing the secure hash in the domain of the non-volatile memory when the domain is in non-secure mode, otherwise generating an error condition; and in response to a request from the system administrator to access secret data stored in the domain of the non-volatile memory, generating an error condition if a secure hash, sent with the request to the secure storage device, is not found in the non-volatile memory or does not match with the stored secure hash.

The method according to an embodiment of the invention enables for binding of secret data to an operating system, e.g. a logical partition, to prevent unauthorized use or change of secret data, e.g. in hardware security modules, such as crypto cards, in the logical partition of a virtualized computer system.

As used herein, cryptographic may be abbreviated as crypto.

Due to the inventive method the usage of crypto resources with secret data after reconfiguration of the system may advantageously be avoided.

Reconfiguration may be understood as a change of a crypto domain configuration, e.g. a move of crypto secrets from a logical partition to another logical partition. In a normal or planned action a customer may or may not want to use secret data after reconfiguration. For this purpose crypto panels may be prepared to handle this. Domain zeroize setting on the panel can be 'deselected'. In an unplanned action, e.g. by failure, a system administrator may erroneously change the configuration of the system. A default zeroize of secrets may occur. Domain zeroize setting on panel can be 'deselected'. In an attack against the system the configuration may be changed to use crypto data in another logical partition.

For this purpose the inventive method provides a physical protection of unchanged secret data in a secure storage device, such as, e.g. a hardware security module (HSM), which may be realized as a crypto card (a hardware device accelerating cryptographic operations). Logical protection is achieved on a logical partition and Operating System image boundary level.

Securing the configuration of the secure storage device by a secure binding of the secure storage device and its secret data to a logical partition and an Operating System (OS) running in the logical partition in a virtualized system is provided. Configuration of the secure storage device may securely be stored, protected by a system specific key, and maintained in a crypto card. Checking of these configuration data may be performed in every scenario where the configuration might have changed.

Thus the hardware of the computer system knows which software, e.g. an operating system instance, is allowed to use the hardware. The software is bound to the specific hardware. A plurality of logical partitions may be executed, e.g. a maximum of 85 logical partitions, as commonly state of the art. Each partition may access processors of the crypto card via a domain. Thus the non-volatile memory of the crypto card may comprise at least one domain for being accessed by an operating system instance, but advantageously may also comprise a multiple of domains. Changes to the configuration may be allowed only by a trusted key entry device which is controlled by the customer. By means of a secure hash it is possible to guarantee that requests to change the configuration are issued by a system allowed to use the hardware. A trusted key entry flag determines if changes to the system are allowed or not. Each change is authorized by the trusted key entry device. By this way it is possible to avoid that the changes to the system are performed by non-authorized persons or by fault.

Further, a favorable computer program product is proposed for operating a secure storage device with a non-volatile memory on a computer system which executes multiple operating system instances simultaneously. The non-volatile memory comprises one or more domains which are used by the operating system instances. A separate trusted key entry system is used to configure secret data of an operating system instance stored in the non-volatile memory. The computer program product comprises a computer readable storage medium having program instructions embodied therewith, the program instructions executable by the computer system to cause the computer system to perform a method comprising: in response to a corresponding request from the trusted key entry system, the computer system setting a domain to either secure or non-secure mode; generating a unique identifier of the operating system instance; generating a secure hash for the operating system instance based on the unique identifier and domain specific cryptographic configuration data; in response to a request from a system administrator to configure the secure storage device for use, storing the secure hash in the domain of the non-volatile memory when the domain is in non-secure mode, otherwise generating an error condition; and in response to a request from the system administrator to access secret data stored in the domain of the non-volatile memory, generating an error condition if a secure hash, sent with the request to the secure storage device, is not found in the non-volatile memory or does not match with the stored secure hash.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
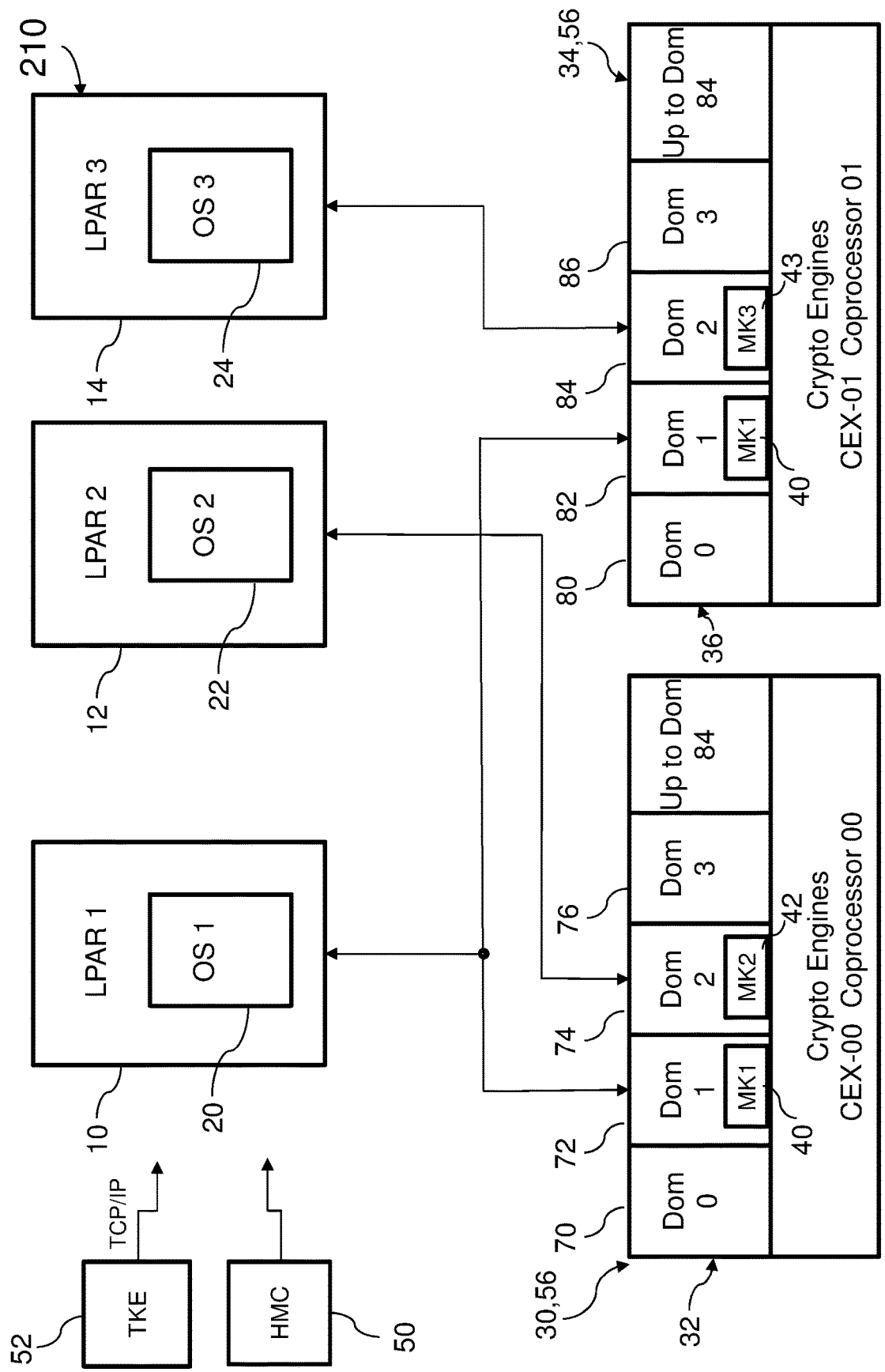
FIG. 1 depicts a setup of logical partitions of a virtualized computer system with an instruction flow to crypto domains on hardware security modules according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method for operating a secure storage device with a non-volatile memory on a computer system, which executes multiple operating system instances, wherein the non-volatile memory comprises one or more domains which are used by the operating system instances. The illustrative embodiments may be used for the method for operating the secure storage device, wherein a separate trusted key entry system is used to configure secret data of an operating system instance stored in the non-volatile memory. The illustrative embodiments are sometimes described herein using particular technologies only as an example for the clarity of the description.

FIG. 1 depicts a setup of logical partitions 10, 12, 14 of a virtualized computer system 212 with an instruction flow to crypto domains 70, 72, 74, 76, 80, 82, 84, 86 on hardware security modules 30, 34 as secure storage devices 56 according to an embodiment of the invention. In the logical partitions 10, 12, 14 operating systems instances 20, 22, 24 are active.

The hardware security modules 30, 34, which may be realized as crypto cards, are used as a secure storage device 56 and comprise non-volatile memories 32, 36. The non-volatile memories 32, 36 comprise a multiple of domains 70, 72, 74, 76, 80, 82, 84, 86, wherein secret data 40, 42, 43 are stored as master keys MK1, MK2, MK3 in different domains 70, 72, 74, 76, 80, 82, 84, 86 each.

A domain 70, 72, 74, 76, 80, 82, 84, 86 may be attributed to a single operating system instance 20, 22, 24.

The hardware security modules 30, 34 comprise crypto coprocessors, respectively, as crypto engines. The crypto coprocessors are configured to the logical partitions 10, 12, 14.

A coprocessor of the hardware security module 30, 34 is hosting e.g. up to 85 physical crypto domains 70, 72, 74, 76, 80, 82, 84, 86, which are physically and logically secure registers where the master keys MK1, MK2, MK3 as secret data 40, 42, 43 of each sharing logical partition 10, 12, 14 can be safely kept. The logical partition image profile specifies the coprocessor of the hardware security module 30, 34 and the crypto domain 70, 72, 74, 76, 80, 82, 84, 86 to which the logical partition 10, 12, 14 has access.

Control domains are used to administer the coprocessors of the hardware security module 30, 34. The control domains are defined in an image activation profile.

A hardware management console (HMC) 50 may be used for defining and/or setting up the image activation profile, where a number of logical partitions 10, 12, 14 and/or a number of processors is defined.

The logical partition 10 is using the crypto domain 72 of crypto card 30 and the crypto domain 82 of crypto card 34, both containing a secret data 40. The logical partition 12 is using crypto domain 74 of crypto card 30, containing a secret data 42. The logical partition 14 is using crypto domain 84 of crypto card 34, containing the secret data 43. A crypto domain 70, 72, 74, 76, 80, 82, 84, 86 may only be used by one operating system instance 20, 22, 24. A crypto domain 70, 72, 74, 76, 80, 82, 84, 86 may not be shared between logical partitions 10, 12, 14.

A separate trusted key entry system 52 may be used to configure the secret data 40, 42, 43 of the operating system instances 20, 22, 24 stored in the domains 70, 72, 74, 76, 80, 82, 84, 86 of the non-volatile memory 32, 36. Information may be sent via the TCP/IP protocol secured by secure sockets layer/transport layer security (SSL/TLS).

Figure 2:
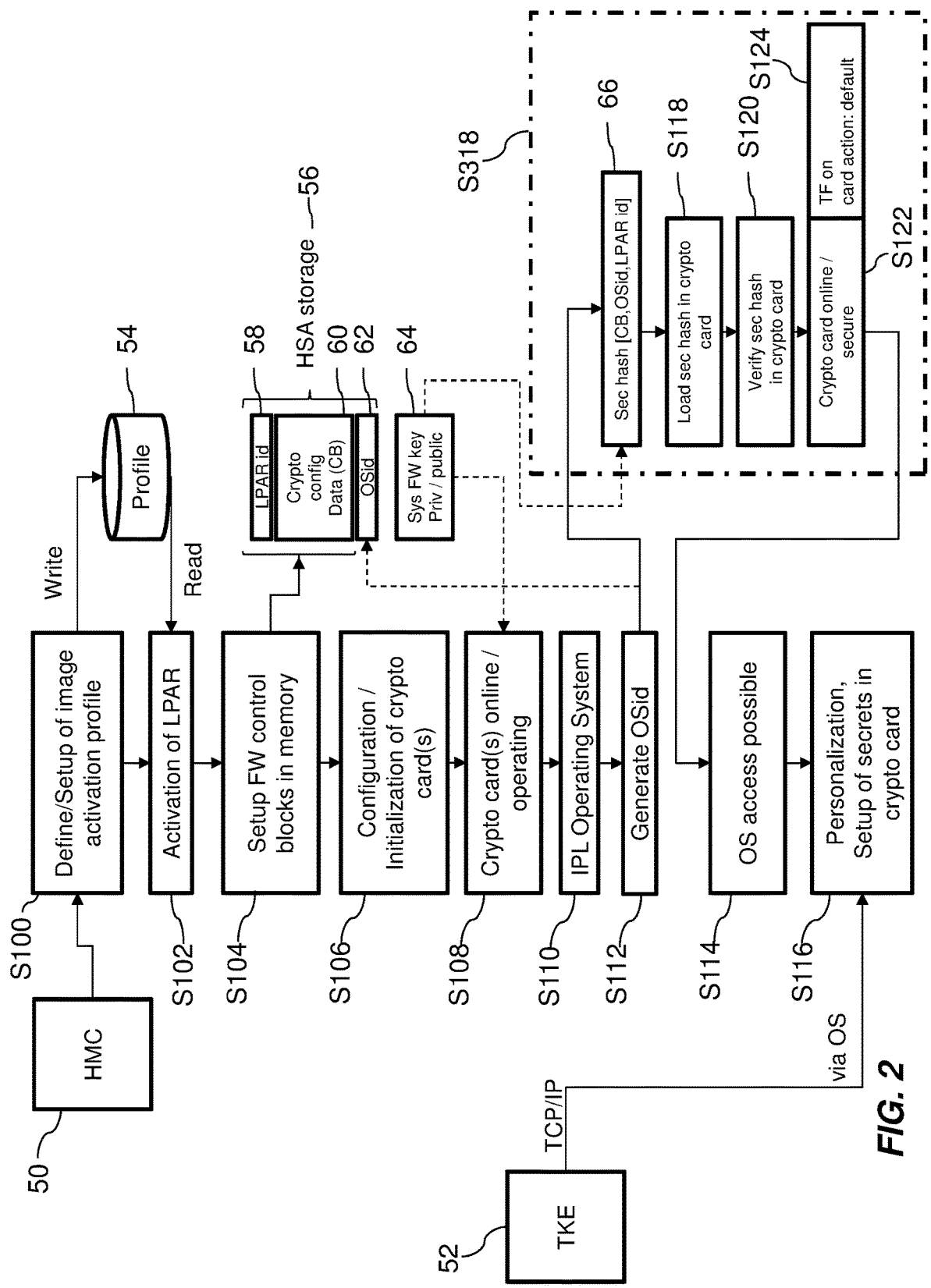
FIG. 2 depicts a flow chart for initialization of a logical partition with hardware security modules according to an embodiment of the invention.

FIG. 2 depicts a flow chart for initialization of a computer system 210 with hardware security modules 30, 34 according to an embodiment of the invention.

The inventive method is intended for operating a secure storage device 56 with a non-volatile memory 32, 36 on a computer system 212 which executes multiple operating system instances 20, 22, 24. The non-volatile memory 32, 36 comprises a multiple of domains 70, 72, 74, 76, 80, 82, 84, 86 which are used by the operating system instances 20, 22, 24. The separate trusted key entry system 52 is used to configure secret data 40, 42, 43 of the operating system instances 20, 22, 24 stored in the domains 70, 72, 74, 76, 80, 82, 84, 86 of the non-volatile memory 32, 36.

Cryptographic configuration data 60 of the logical partition 10, 12, 14 is stored as secure hash 66 in the non-volatile memory 32, 36.

The non-volatile memory 32, 36 is implemented on hardware secure modules 30, 34 used as the secure storage device 56.

In response to a corresponding request from the trusted key entry system 52, the computer system 212 sets a domain 70, 72, 74, 76, 80, 82, 84, 86 to either secure or non-secure mode. Further a unique identifier 62 of the operating system instance 20, 22, 24 is generated. Next a secure hash 66 for the operating system instance 20, 22, 24 is generated by the firmware of the computer system 212, based on the unique identifier 62 and domain specific cryptographic configuration data 60.

A system firmware key may be used for generating the secure hash 66.

In response to a request from the system administrator to configure the secure storage device 56 for use, the secure hash 66 is stored in the domain 70, 72, 74, 76, 80, 82, 84, 86 of the non-volatile memory 32, 36 when the domain 70, 72, 74, 76, 80, 82, 84, 86 is in non-secure mode, otherwise an error condition is generated.

In response to a request from the system administrator to access secret data 40, 42, 43 stored in the domain 70, 72, 74, 76, 80, 82, 84, 86 of the non-volatile memory 32, 36, an error condition is generated if a secure hash 66, sent with the request to the secure storage device 56, is not found in the non-volatile memory 32, 36 or does not match with the stored secure hash 66.

Summarizing the secure hash 66 is generated by the firmware prior to a request from the system administrator to configure the secure storage device 56 for use and/or prior to access secret data 40, 42, 43 stored in the domain 70, 72, 74, 76, 80, 82, 84, 86 of the non-volatile memory 32, 36 and then handed over to the secure storage device 56.

An error condition may only be generated if there is a mismatch of the secure hash 66 stored in the domain 70, 72, 74, 76, 80, 82, 84, 86 of the non-volatile memory 32, 36 and a secure hash 66 sent with the request from the system administrator. If there is no secure hash 66 existing for a domain 70, 72, 74, 76, 80, 82, 84, 86, the domain 70, 72, 74, 76, 80, 82, 84, 86 should not be in a secure mode.

A trusted key entry flag is set in case domain 70, 72, 74, 76, 80, 82, 84, 86 is attributed to the operating system instance 20, 22, 24 via the secure hash 66.

The process flow for initialization of a logical partition 100 with crypto cards as hardware security modules 30, 34 according to an embodiment of the invention, depicted in FIG. 2, starts with defining and/or setting up an image activation profile in step S100, where a number of logical partitions 10, 12, 14 and/or a number of processors is defined. Input to this step is delivered by the hardware management console (HMC) 50. The profile is written to the storage 54, from which it may be read when activating a logical partition 10 in step S102. Next in step S104 firmware control blocks are set up in the hardware secure architecture (HSA) storage 56 for defining memory accesses, comprising an identity of the logical partition 58 as well as cryptographic configuration data 60. Then at least one crypto card as hardware security module 30, 34 is configured and/or initialized in step S106 in a secure boot process, followed by step S108, where the crypto card 30, 34 is operating. In step S110 an initial program load of an operating system instance 20 is performed, followed by generating an identity (OSid) of the operating system instance 20 in step S112. The OSid is stored in the secure storage device 56 as well.

Then the secure binding process S318 is started by generating a secure hash 66 with the OSid and a system firmware key 64 as a certificate, which may be either private or public. The secure hash 66 is loaded by the operating system instance 20 into the crypto card 30 in step S118, followed by a verifying process in the crypto card 30 in step S120. Then the crypto card 30 is set to online in a secure mode in step S122. A trusted key entry flag TF is set to an on-state in step S124, resulting in setting a crypto card action to default action. If the trusted key entry flag TF is in an on-state, no changes to the system are allowed, if the trusted key entry flag TF is in an off-state, changes to the system are allowed. The customer thus may authorize the provider via the trusted key entry flag to perform changes to the system. Authorization is enabled via the trusted key entry device 52.

Having accomplished the secure binding process S318, access to the operating system instance 20 is possible, step S114. By action of a customer via the trusted key entry device 52, which may be a terminal or e.g. a Linux workstation, transmitted possibly over TCP/IP via the operating system, a personalization and a setup of secret data 40 in the crypto card 30 can be performed.

Figure 3:
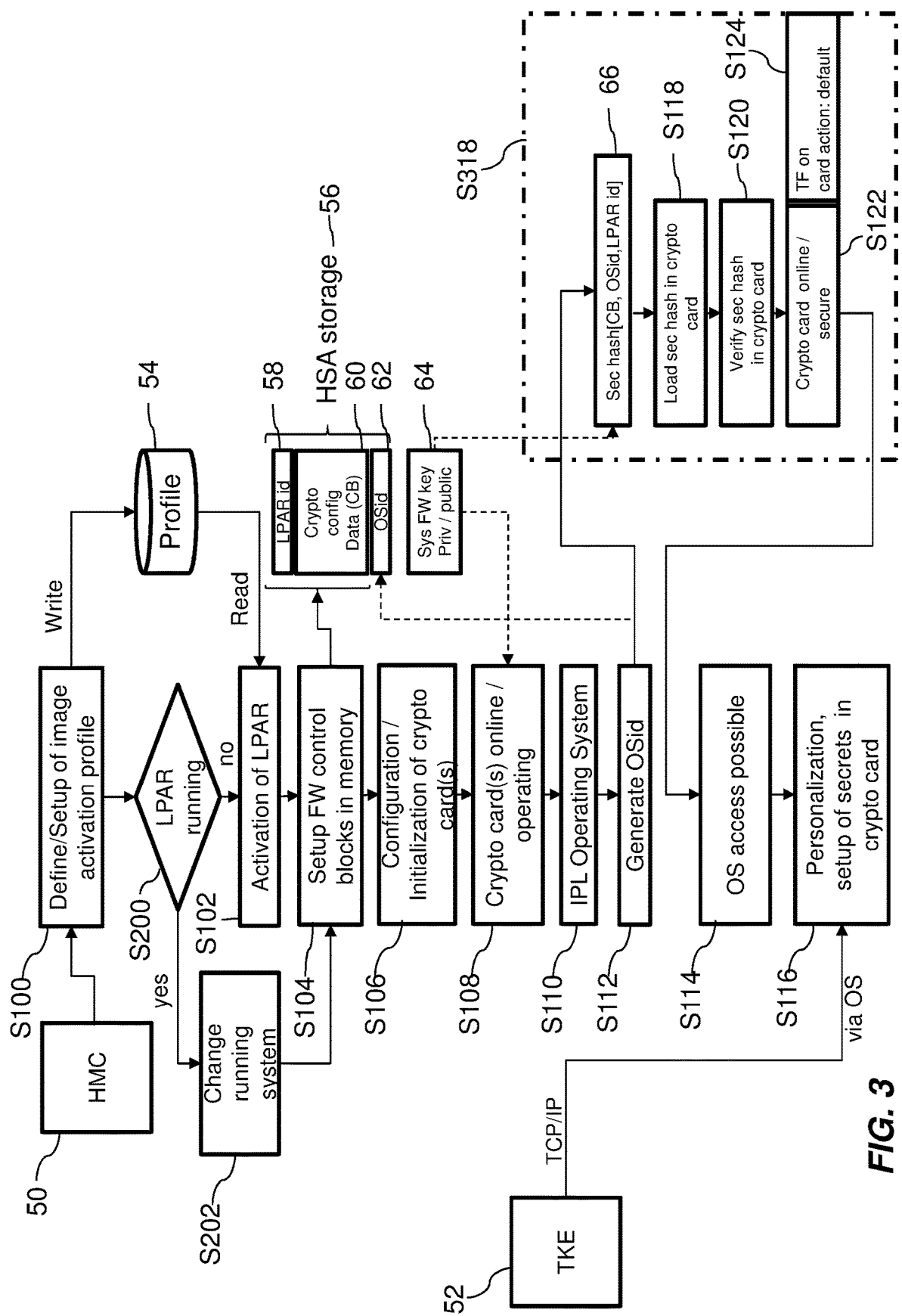
FIG. 3 depicts a flow chart for a change in configurations of a running logical partition during operation according to an embodiment of the invention.

FIG. 3 depicts a flow chart for a change in configurations of a running logical partition 10 during operation according to an embodiment of the invention.

This process is quite similar to the process described in FIG. 2 for the initialization of the logical partition 10. In order to avoid unnecessary repetitions the steps that are equal are not described again.

At the beginning of the process flow, after defining and/or setting up the image activation profile of the logical partition 10 in step s100, there is a check in step S200, if the logical partition 10 is already running. If this is the case, the running system is changed in step S202 and continued in step S104 by setting up the firmware control blocks in the storage 56.

Otherwise the logical partition 10 is activated in step S102. The subsequent steps are as in FIG. 2 depicted.

Figure 4:
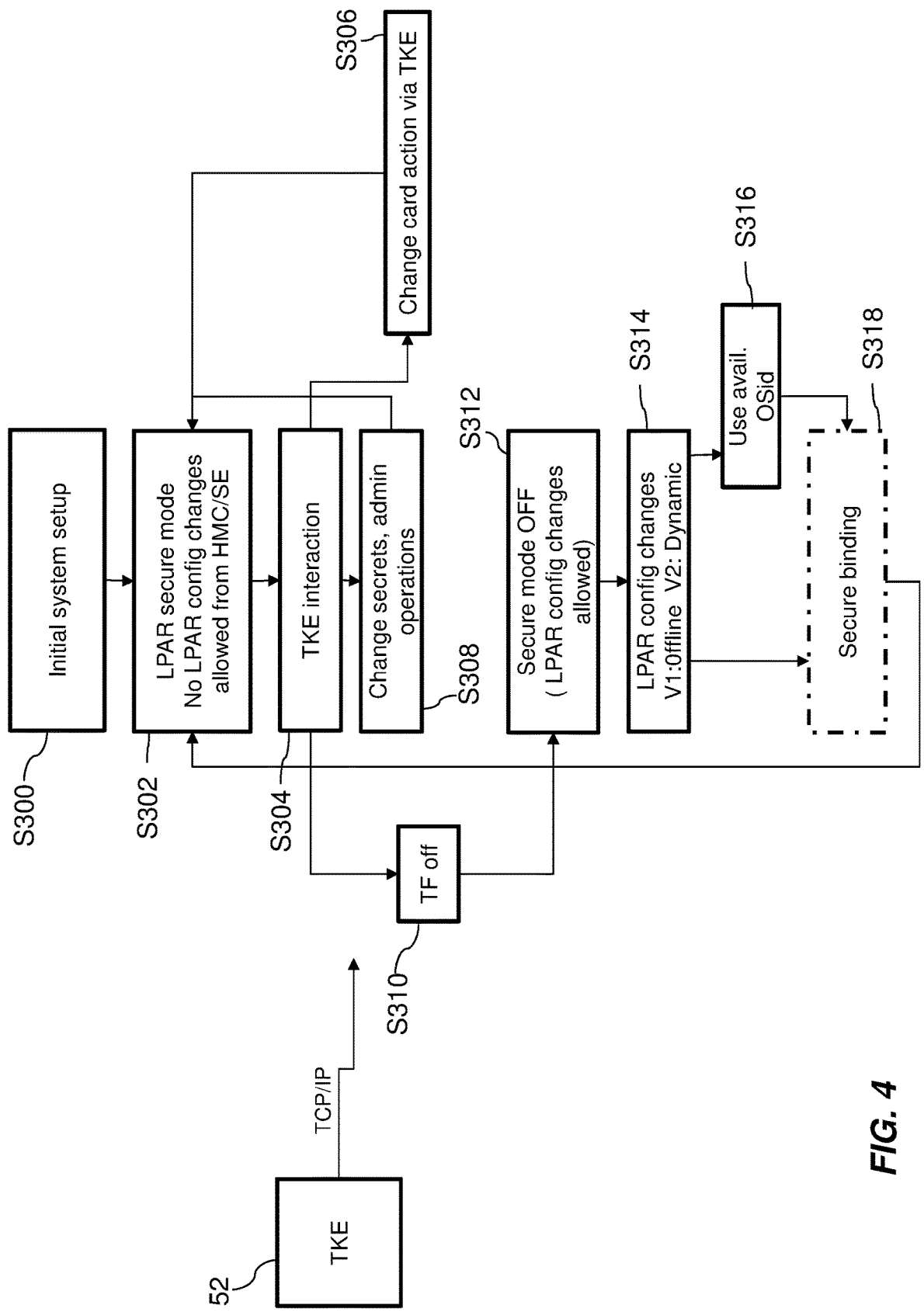
FIG. 4 depicts a flow chart for operating a logical partition with hardware security modules according to an embodiment of the invention.

FIG. 4 depicts a flow chart for operating a logical partition 10 with crypto cards as hardware security modules 30, 34 according to an embodiment of the invention.

The process flow starts in step S300 with an initial system setup. The logical partition 10 is in a secure mode. Therefore changes of the configuration via a hardware management console 50 are not possible, but only via the trusted key entry device 52, step S302. If there is an interaction by the customer via the trusted key entry device 52 in step S304, the trusted key entry flag is set to the off-state in step S310. The secure mode is set to off in step S312, meaning that configuration changes of the logical partition 10 are allowed, authorized by the customer via the TKE interaction. Configuration changes may be performed in two versions, offline or dynamic. Offline means that the secure binding sub-process S318, described in FIG. 1, is performed, before returning to the secure mode of the logical partition 10 in step S302. If the changes are carried out dynamically the available identity OSid is used in step S316, before performing the secure binding sub-process S318.

Via the TKE interaction in step S304 also a change crypto card action may be initiated in step S306, which is ended by returning to the secure mode in step S302.

A change of secret data and operations by the system administrator in step S308 leads also to returning to the secure mode in step S302.

Running crypto card operations are started by an operation running according to state of the art. No change is required. If cryptographic requests are sent to the crypto card 30, running an operating system instance 20 in a logical partition 10, first a base configuration and/or a format layout checking is performed. Then the cryptographic request is processed by the crypto card 30 and a cryptographic response returned to the originator, via the operating system instance 20 of the logical partition 10.

Figure 5:
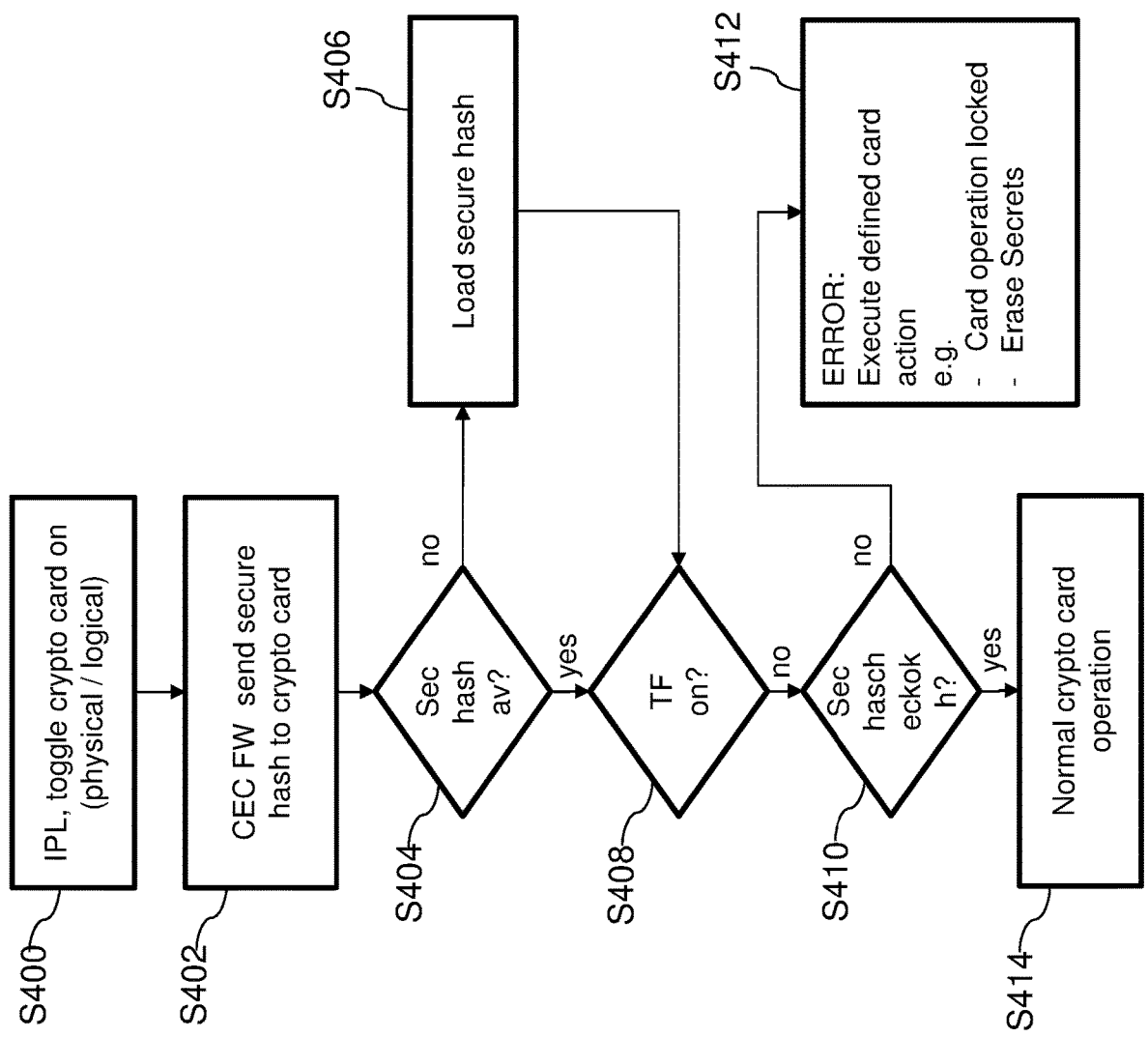
FIG. 5 depicts a flow chart for a change of a configuration of a logical partition according to an embodiment of the invention.

FIG. 5 depicts a flow chart for a change of a configuration of a logical partition 10, 12, 14 according to an embodiment of the invention.

The cryptographic configuration data 60 is checked in case configuration of the logical partition 10, 12, 14 is changed.

In step S400 following an initial program load (IPL) the crypto card 30 is toggled on. Next in step S402 the firmware of the crypto card 30 sends the secure hash 66 to the crypto card 30. In step S404 it is checked if there is the secure hash 66 available. The trusted key entry flag may determine whether configuration changes of the logical partitions 10, 12, 14 are allowed. Therefore, if this is the case it is checked if the trusted key entry flag TF is in the on-state in step S408. The trusted key entry flag indicates for a specific logical partition 10, 12, 14 if an attributed domain 70, 72, 74, 76, 80, 82, 84, 86 is in secure mode.

If the TF is on there is no change to the system allowed. So, if this is not the case a secure hash check is performed in step S410. If this check is ok the normal crypto card operation continues. If there is no secure hash available in step S404 the secure hash is loaded in step S406 and the process flow continues in step S408. The trusted key entry flag indicates for a specific logical partition 10, 12, 14 to delete secret data 40, 42 in case of changing the cryptographic configuration data 60 and/or removing the secure storage device 56 from the computer system 212. Thus, if the secure hash check fails in step S410 an error condition is generated and a defined crypto card action defined, like e.g. the card operation to be locked and the secret data to be erased. Secret data 40, 42 may be deleted in case of removing the secure storage device 56 from the computer system 212.

Figure 6:
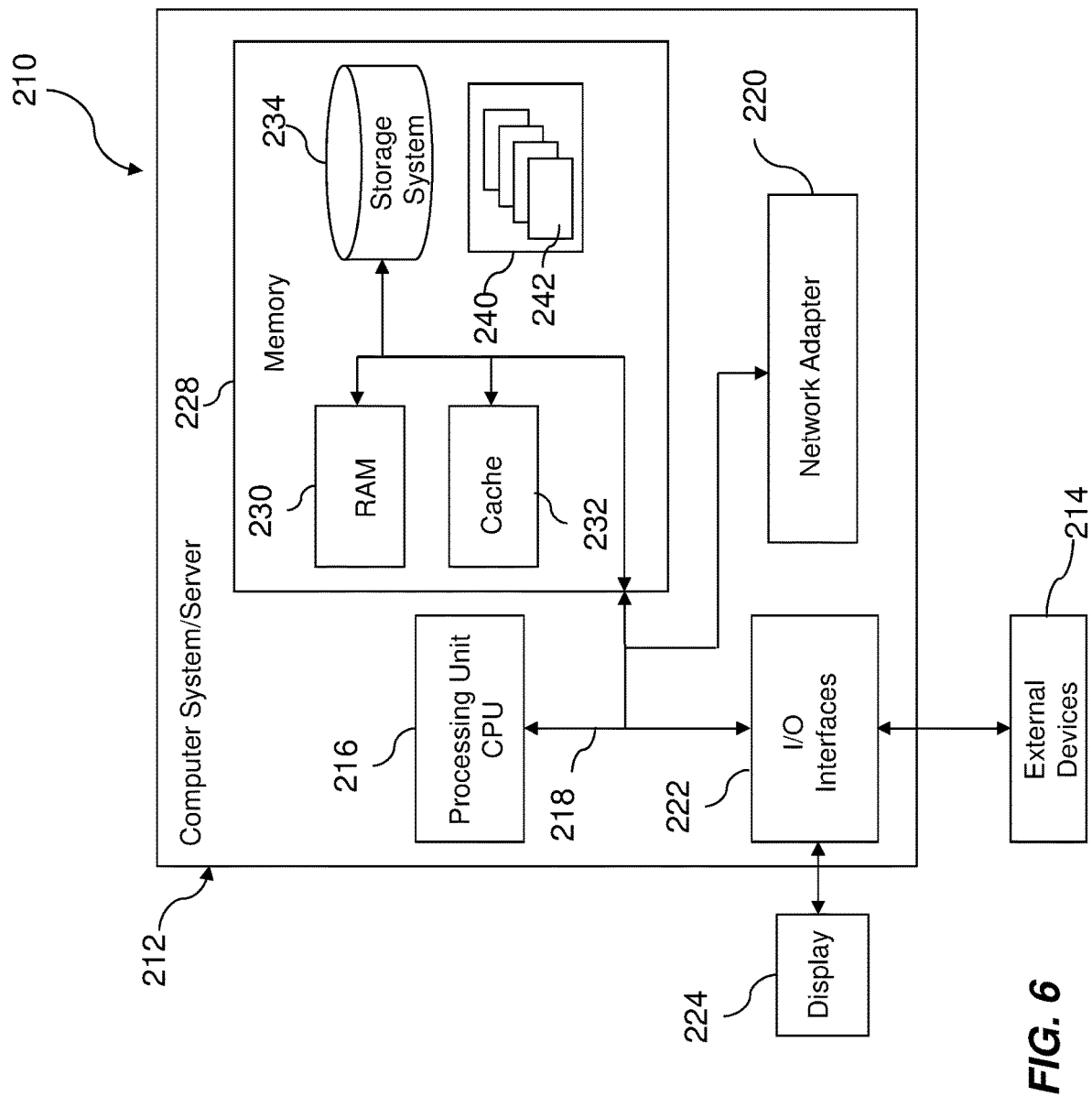
FIG. 6 depicts an example embodiment of a data processing system for executing a method according to the invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for operating a secure storage device with a non-volatile memory on a computer system which executes multiple operating system instances, the method comprising:
setting a domain to either secure mode or non-secure mode in response to a corresponding request from a trusted key entry system, wherein setting the domain further comprises:
defining, by a hardware management console, an image activation profile comprising a number of logical partitions and a number of processors;
establishing firmware control blocks in hardware secure architecture storage comprising an identity of a logical partition within the number of logical partitions and cryptographic configuration data; and
configuring at least one cryptographic card as a hardware security module in a secure boot process;
generating a unique identifier of an operating system instance;
generating a secure hash for the operating system instance based on the unique identifier and domain specific cryptographic configuration data;
storing, in response to a request from a system administrator to configure the secure storage device for use, the secure hash in a domain of non-volatile memory when the domain is in non-secure mode, and otherwise generating an error condition;
generating, in response to a request from the system administrator to access secret data stored in the domain of the non-volatile memory, an error condition if a secure hash, sent with the request to the secure storage device, is not found in the domain or does not match with the stored secure hash,
wherein the non-volatile memory comprises one or more domains which are used by operating system instances, and wherein a separate trusted key entry system is used to configure secret data of an operating system instance stored in the non-volatile memory.

2. The method according to claim 1, wherein the operating system instances are active on different logical partitions.

3. The method according to claim 1, wherein the secret data is stored in different domains.

4. The method according to claim 1, wherein a system firmware key is used for generating the secure hash.

5. The method according to claim 1, wherein the non-volatile memory is implemented on hardware security modules as the secure storage device.

6. The method according to claim 1, wherein a trusted key entry flag is set in case the domain is attributed to the operating system instance via the secure hash.

7. The method according to claim 1, wherein cryptographic configuration data of a logical partition is stored as secure hash in the domain of the non-volatile memory.

8. The method according to claim 1, wherein the trusted key entry flag indicates for a specific logical partition if an attributed domain is in secure mode.

9. The method according to claim 1, further comprising deleting secret data in case of changing the cryptographic configuration data.

10. The method according to claim 1, further comprising deleting secret data in case of removing the secure storage device from the computer system.

11. The method according to claim 1, wherein the trusted key entry flag indicates for a specific logical partition to delete secret data in case of removing the secure storage device from the computer system.

12. The method according to claim 3, wherein one or more a domains are attributed to a single operating system instance.

13. The method according to claim 6, wherein the trusted key entry flag determines whether configuration changes of the logical partitions are allowed.

14. The method according to claim 7, wherein the cryptographic configuration data is checked in case configuration of the logical partition is changed.

15. A computer program product to operate a secure storage device having computer instructions embodied therewith, the computer instructions executable to perform a method comprising:
setting a domain to either secure mode or non-secure mode in response to a corresponding request from a trusted key entry system, wherein setting the domain further comprises:
defining, by a hardware management console, an image activation profile comprising a number of logical partitions and a number of processors;

establishing firmware control blocks in hardware secure architecture storage comprising an identity of a logical partition within the number of logical partitions and cryptographic configuration data; and configuring at least one cryptographic card as a hardware security module in a secure boot process;

generating a unique identifier of an operating system instance;

generating a secure hash for the operating system instance based on the unique identifier and domain specific cryptographic configuration data;

storing, in response to a request from a system administrator to configure a secure storage device for use, the secure hash in a domain of non-volatile memory when the domain is in non-secure mode, and otherwise generating an error condition;

generating, in response to a request from the system administrator to access secret data stored in the domain of the non-volatile memory, an error condition if a secure hash, sent with the request to the secure storage device, is not found in the domain or does not match with the stored secure hash, wherein the non-volatile memory comprises one or more domains which are used by operating system instances, and wherein a separate trusted key entry system is used to configure secret data of an operating system instance stored in the non-volatile memory.

16. A computer system operating a secure storage device, the computer system comprising:

one or more computer processors, one or more computer-readable storage media, and program instructions stored on one or more of the computer-readable storage media for execution by at least one of the one or more processors, the program instructions, when executed, perform a method, the method comprising:

setting a domain to either secure mode or non-secure mode in response to a corresponding request from a trusted key entry system, wherein setting the domain further comprises:

defining, by a hardware management console, an image activation profile comprising a number of logical partitions and a number of processors;

establishing firmware control blocks in hardware secure architecture storage comprising an identity of a logical partition within the number of logical partitions and cryptographic configuration data; and configuring at least one cryptographic card as a hardware security module in a secure boot process;

generating a unique identifier of an operating system instance;

generating a secure hash for the operating system instance based on the unique identifier and domain specific cryptographic configuration data;

storing, in response to a request from a system administrator to configure a secure storage device for use, the secure hash in a domain of non-volatile memory when the domain is in non-secure mode, and otherwise generating an error condition;

generating, in response to a request from the system administrator to access secret data stored in the domain of the non-volatile memory, an error condition if a secure hash, sent with the request to the secure storage device, is not found in the domain or does not match with the stored secure hash, wherein the non-volatile memory comprises one or more domains which are used by operating system instances, and wherein a separate trusted key entry system is used to configure secret data of an operating system instance stored in the non-volatile memory.

* * * * *